United States Patent
Takeuchi et al.

(10) Patent No.: US 7,655,180 B2
(45) Date of Patent: Feb. 2, 2010

(54) METHOD FOR CONTROLLING SHRINKAGE OF FORMED CERAMIC BODY

(75) Inventors: Yukihisa Takeuchi, Nishikamo-Gun (JP); Tsutomu Nanataki, Toyoake (JP); Koichi Iwata, Kani (JP); Katsuyuki Takeuchi, Aisai (JP); Takuji Kimura, Kariya (JP)

(73) Assignee: NGK Insulators, Ltd., Nagoya (JP)

(*) Notice: Subject to any disclaimer, the term of this patent is extended or adjusted under 35 U.S.C. 154(b) by 875 days.

(21) Appl. No.: 11/182,994

(22) Filed: Jul. 15, 2005

(65) Prior Publication Data

US 2006/0043648 A1    Mar. 2, 2006

(30) Foreign Application Priority Data

Aug. 26, 2004    (JP)    ............... 2004-246953

(51) Int. Cl.
*B28B 1/00*    (2006.01)
(52) U.S. Cl. ........................ 264/672; 264/650
(58) Field of Classification Search ........... 264/650, 264/672
See application file for complete search history.

(56) References Cited

U.S. PATENT DOCUMENTS

| 5,733,499 A | 3/1998 | Takeuchi et al. |
| 5,753,160 A | 5/1998 | Takeuchi et al. |
| 5,955,392 A | 9/1999 | Takeuchi et al. |
| 6,051,171 A | 4/2000 | Takeuchi et al. |
| 6,395,117 B1 | 5/2002 | Takeuchi et al. |

*Primary Examiner*—Eric Hug
*Assistant Examiner*—Russell J Kemmerle, III
(74) *Attorney, Agent, or Firm*—Burr & Brown

(57) ABSTRACT

A method for controlling the shrinkage of ceramic formed bodies is provided, including performing a preliminary test to determine an average shrinkage of ceramic formed bodies made from test lots of a ceramic powder, and determining a linear correlation between the average shrinkage and measured amounts of the ground test lots removed from a ball mill during a specific milling time interval. A batch of the ceramic powder is then ground, an amount of the ground ceramic powder removed from the ball mill during the specific time interval is measured, and the linear correlation is used to estimate the shrinkage of a ceramic body made therefrom. The difference between a target shrinkage and the estimated shrinkage is determined, and one or more of the processing conditions used to form the ceramic body are changed to offset the difference.

9 Claims, 3 Drawing Sheets

MASS(kg) OF GROUND CERAMIC POWDER TAKEN OUT
DURING RELATIVE ELAPSE TIME OF 75~100

HEAT TREATMENT TEMPERATURE (°C)

METHOD FOR CONTROLLING SHRINKAGE OF FORMED CERAMIC BODY

BACKGROUND OF THE INVENTION

1. Field of the Invention

The present invention relates to a method for controlling the shrinkage of a formed ceramic body during firing and, more particularly, to a method for controlling the shrinkage of a formed ceramic body when a ceramic product is manufactured by a predetermined manufacturing process from ceramic powder produced by grinding using a dry-type ball mill such as an Attritor.

2. Description of Related Art

To increase the accuracy of dimension and shape of finished products and to avoid defects in the shape and the like in the manufacture of ceramic products, it is important to control the degree of firing shrinkage when a formed body is produced from a raw material such as a ceramic powder and is fired to obtain a fired body. Particularly, in the context of electronic parts such as ICs and condensers, in which multi-layer ceramic substrates are used, controlling the shrinkage of the green sheets used for the multi-layer ceramic substrates is very important.

FIG. 5 is a process flow diagram showing a process for manufacturing green sheets for multi-layer ceramic substrates. In this manufacturing process, ceramic powder procured by purchasing and is ground using attritor (hereinafter referred to as a dry-type ball mill). The ground ceramic powder is taken out from the ball mill and treated with heat.

Next, a binder, a dispersant, a plasticizer, and the like are added to the ground ceramic powder. Then, a liquid such as butanol is further added and the resulting material is mixed using a trommel mixer.

The slurry obtained in this manner is molded into a formed body (a green sheet) with predetermined dimensions using a doctor blade forming machine. The formed body is then dried and fired.

Conventionally, a commonly accepted method of controlling the firing shrinkage in the process for manufacturing ceramic products has been to suppress fluctuation of the shrinkage by constantly employing fixed manufacturing conditions (no specific prior art document has been found on this subject). As specific manufacturing conditions in the process for manufacturing green sheets, for example, heat treatment conditions for treating ground ceramic powder with heat (heating temperature, heating time, etc.), the composition of compounded ingredients (the amount of a dispersant, etc.), raw material mixing conditions (mixing time, etc.), formed body drying conditions (temperature, air flow rate, etc.), press conditions (temperature, mass, etc.), formed body firing conditions (firing temperature, firing time, etc.), and the like can be given. It has been a conventional practice to maintain all of these conditions constant for controlling the shrinkage.

However, even if all of these conditions in the process of manufacturing ceramic products are maintained constant, the shrinkage significantly fluctuates according to the lot of ground ceramic powder used. Thus, it has been difficult to accurately control the shrinkage by conventional controlling methods.

The present invention has been completed in view of this situation and has an object of providing a method for controlling the shrinkage of formed ceramic bodies, by which it is possible to suppress fluctuation of the shrinkage of formed ceramic bodies and to cause the shrinkage amount to approximate a target rate.

SUMMARY OF THE INVENTION

According to the present invention, in a method of manufacturing ceramic products by a predetermined manufacturing process from ceramic powder ground by a dry-type ball mill, a method for controlling the shrinkage of formed ceramic bodies comprises determining a correlation between the amount of the ground ceramic powder taken out from the dry-type ball mill in a given time interval and the average shrinkage during firing of a formed ceramic body made from the ground ceramic powder, and thereafter adjusting the manufacturing conditions based on the previously-determined conditions for the above-mentioned manufacturing process and the correlation with respect to the shrinkage obtained.

According to another feature of the present invention, a method for controlling the shrinkage of formed ceramic bodies comprises determining a shrinkage of formed ceramic bodies by manufacturing the ceramic products by a predetermined manufacturing process from ceramic powder ground using a dry-type ball mill, followed by firing, determining a correlation between the mass of the ground ceramic powder taken out from the dry-type ball mill over a fixed period of time and the average shrinkage, estimating the expected shrinkage of other formed ceramic bodies made from the ceramic powder based on the above correlation from the mass of the ground ceramic powder taken out from the dry-type ball mill over a predetermined period of time, and partially adjusting the manufacturing conditions based on the previously-determined conditions for the above-mentioned manufacturing process and the correlation with respect to the shrinkage obtained to offset the difference between the estimated shrinkage and the target shrinkage.

The shrinkage in the present invention is preferably the average shrinkage determined by the following formula (1):

$$\text{Average shrinkage} = (\text{longitudinal shrinkage} + \text{lateral shrinkage} + \text{thickness shrinkage})/3 \quad (1),$$

wherein the longitudinal shrinkage is a value determined by the following formula (2), the lateral shrinkage is a value determined by the following formula (3), and the thickness shrinkage is a value determined by the following formula (4):

$$\text{Longitudinal shrinkage} = \text{longitudinal dimension before firing}/\text{longitudinal dimension after firing} \quad (2);$$

$$\text{Lateral shrinkage} = \text{lateral dimension before firing}/\text{lateral dimension after firing} \quad (3);$$

and $$\text{Thickness shrinkage} = \text{thickness before firing}/\text{thickness after firing} \quad (4).$$

In the present invention, assuming that the time required to tale out 90% by mass of ground ceramic powder from the dry-type ball mill from the start of taking out the ground ceramic powder is 100, the above mass of the ground ceramic powder taken out from the dry-type ball mill is preferably the mass of the ground ceramic powder taken out during a relative time interval of 75 to 100.

Furthermore, in the present invention, the equivalent spherical diameter (Rs) of the ceramic powder to be ground by the dry-type ball mill represented by the formula $Rs\ (\mu m) = 6/\rho S$ is preferably 1 μm or less, wherein $\rho$ is the true density (g/cm$^3$) of the ceramic powder and S is the BET specific surface area (m$^2$/g) of the ceramic powder.

According to the controlling method of the present invention, the fluctuation of the shrinkage of formed ceramic bodies can be suppressed and the shrinkage can be approximated to the target rate by measuring the change in mass of the ground ceramic powder taken out from the dry-type ball mill over a time interval and causing the measured results to be reflected in the manufacturing conditions. In this manner, the shrinkage of the formed ceramic body can be accurately controlled with ease.

DETAILED DESCRIPTION OF THE INVENTION

Figure 1:
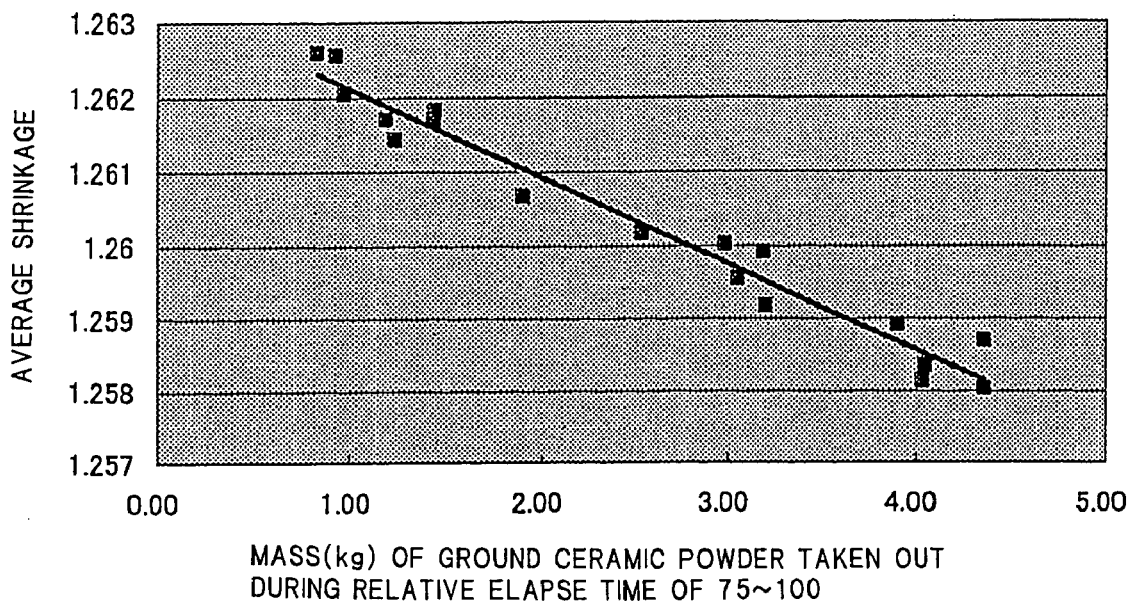
FIG. 1 shows an example of a graph obtained by plotting the average shrinkage against the mass of ground ceramic powder taken out in a relative time interval of 75 to 100.

Specific embodiments of the controlling method according to the present invention will now be described. The present invention, however, should not be construed as being limited to these embodiments. Various alterations, modifications, and improvements are possible within the scope of the present invention by persons skilled in the art.

The present invention has been made based on the finding that when manufacturing a ceramic product using ceramic powder ground by a dry-type ball mill, the temporal response of the amount of the ceramic powder taken out from the dry-type ball mill has a certain correlation with respect to the degree of firing shrinkage (i.e., the shrinkage) of the formed body produced using the ground ceramic powder.

Grinding ceramic powder using a dry-type ball mill is significantly affected by environmental conditions during processing. For example, the ceramic powder becomes moistened on a rainy day due to high humidity and becomes less moistened on a fine day due to low humidity. This creates a variation in the conditions and characteristics of the ground ceramic powder, and causes a temporal fluctuation with respect to the amount of ceramic powder taken out from the dry-type ball mill. In grinding ceramic powder using a dry-type ball mill, balls (rotating balls) are put into the ball mill and rotated to agitate and grind the ceramic powder. The balls are worn as grinding operations are repeated, whereby the grinding conditions change and cause a temporal fluctuation in the amount of the powder taken out. In addition, when the grinding operation is carried out twice a day, the temperature inside the ball mill is higher in the second grinding operation than in the first operation.

Therefore, the fine particle characteristics of the ground ceramic powder can be identified by measuring the temporal change in the amount of ground ceramic powder taken out from the mill, specifically, the mass of the ground ceramic powder taken out from the dry-type ball mill in a given time interval. The fine particle characteristics herein include the form and particle size distribution of the primary particles, the form and particle size distribution of flocculated particles, specific surface area, and the like. The fine particle characteristics greatly affect the shrinkage of a formed body.

Therefore, the temporal response in the amount of ceramic powder taken out from the dry-type ball mill has a correlation with the degree of firing shrinkage, i.e. the shrinkage of the formed body. As a result of extensive studies, the present inventors have found that, assuming that the period of time required to tale out 90% by mass of ground ceramic powder from the dry-type ball mill from the start of talking out of the ground powder is 100, the mass of the ground ceramic powder taken out from the dry-type ball mill during a relative time interval of 75 to 100 greatly affects the shrinkage.

In the present invention, to identify the correlation between the shrinkage and the temporal response in the amount of the ceramic powder taken out from the dry-type ball mill, the ceramic powder is ground using a dry-type attritor ball mill, and using the ground ceramic powder thus obtained, a ceramic body is formed and fired by a manufacturing process under specific conditions, and the correlation rate of the resulting formed body is determined.

There are various methods of specifying the shrinkage according to the form of the products and the like. Although there are no specific limitations to the method of specifying the shrinkage in the present invention, the average shrinkage determined by the following formula (1) can be preferably employed, for example, when the formed ceramic body is a thin green sheet with a certain thickness. An embodiment using the following average shrinkage as the shrinkage will be described in the following description.

$$\text{Average shrinkage} = (\text{longitudinal shrinkage} + \text{lateral shrinkage} + \text{thickness shrinkage})/3 \tag{1},$$

wherein the longitudinal shrinkage is a value determined by the following formula (2), the lateral shrinkage is a value determined by the following formula (3), and the thickness shrinkage is a value determined by the following formula (4):

$$\text{Longitudinal shrinkage} = \text{longitudinal dimension before firing}/\text{longitudinal dimension after firing} \tag{2};$$

$$\text{Lateral shrinkage} = \text{lateral dimension before firing}/\text{lateral dimension after firing} \tag{3};$$

and $$\text{Thickness shrinkage} = \text{thickness before firing}/\text{thickness after firing} \tag{4}.$$

After determining the actual shrinkage in the above-mentioned manner, the correlation between the average shrinkage and the mass of the ground ceramic powder taken out from the dry-type ball mill during the fixed period of time is determined. As the mass of the ground ceramic powder taken out during the fixed period of time, the mass of the ground ceramic powder taken out from the dry-type ball mill during a relative time interval of 75 to 100 is preferably used, provided that the period of time required to take out 90% by mass of the charged ground ceramic powder from the dry-type ball mill from the start of talking out of the ground powder is designated as 100. This is because the mass of the ground ceramic powder taken out during the period of time in this range greatly affects the shrinkage as mentioned above.

To accurately identify the correlation rate, it is preferable to arrange for easy determination of an estimated average shrinkage from the mass of ground ceramic powder taken out during the fixed period of time by conducting the above-described operation two or more times while changing the mass of the ground ceramic powder taken out from the dry-type ball mill during the fixed period of time, for example, by choosing a different circumstance (e.g. weather) in which the ceramic powder is ground, and by producing a graph or formula based on the results. For example, FIG. 1 shows an example of a graph obtained by plotting the average shrinkage against the mass of ground ceramic powder taken out in a relative time interval of 75 to 100.

After identifying the correlation between the average shrinkage and the mass of a ground ceramic powder taken out over the fixed period of time, another lot of the ceramic powder is processed in the same manner using the dry-type ball mill to obtain the ground ceramic powder. If the mass of the ground ceramic powder taken out from the dry-type ball mill during the fixed period of time is determined, an average shrinkage that may be obtained for a ceramic body is formed from this ground ceramic powder and fired under the same manufacturing conditions as that used for identifying the above correlation can be estimated based on this correlation.

In the present invention, the average shrinkage, which may be obtained when a ceramic body is formed from the above ground ceramic powder and fired by a certain manufacturing process at the time when the ceramic powder is taken out from the dry-type ball mill, is estimated. Then, to offset (correct) the difference between the estimated average shrinkage and the target average shrinkage, the operating conditions in the above manufacturing process are partially modified to control the average shrinkage.

Figure 2:
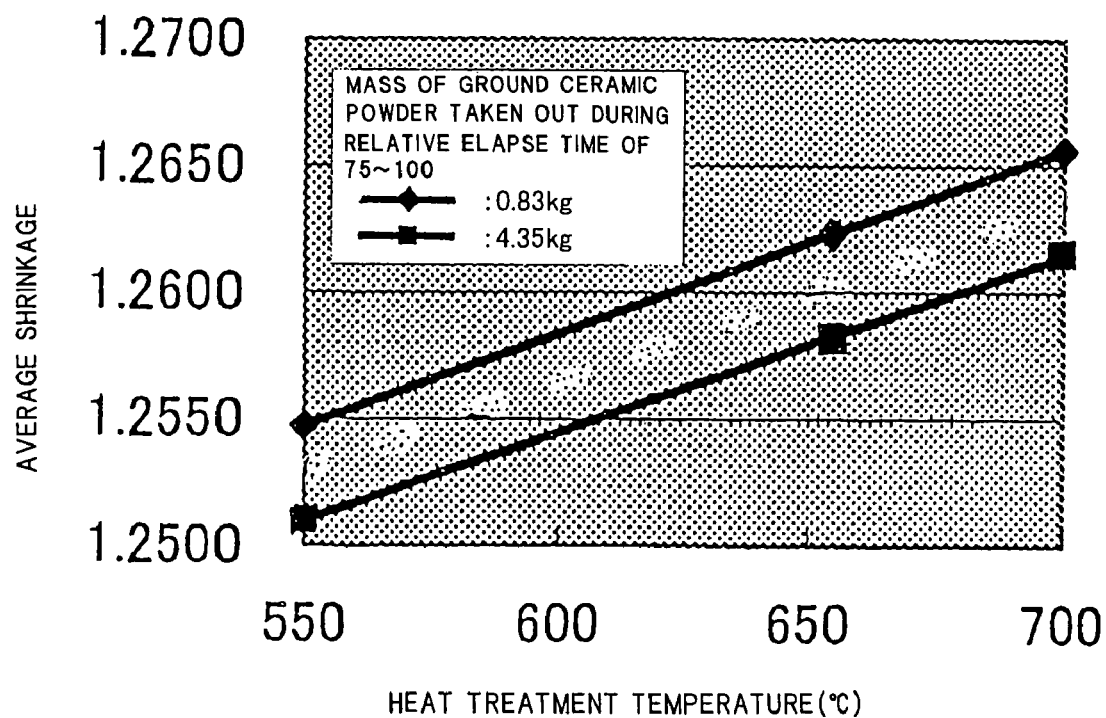
FIG. 2 illustrates an example of a graph obtained by plotting the average shrinkage against the heat treatment temperature.
Figure 5:
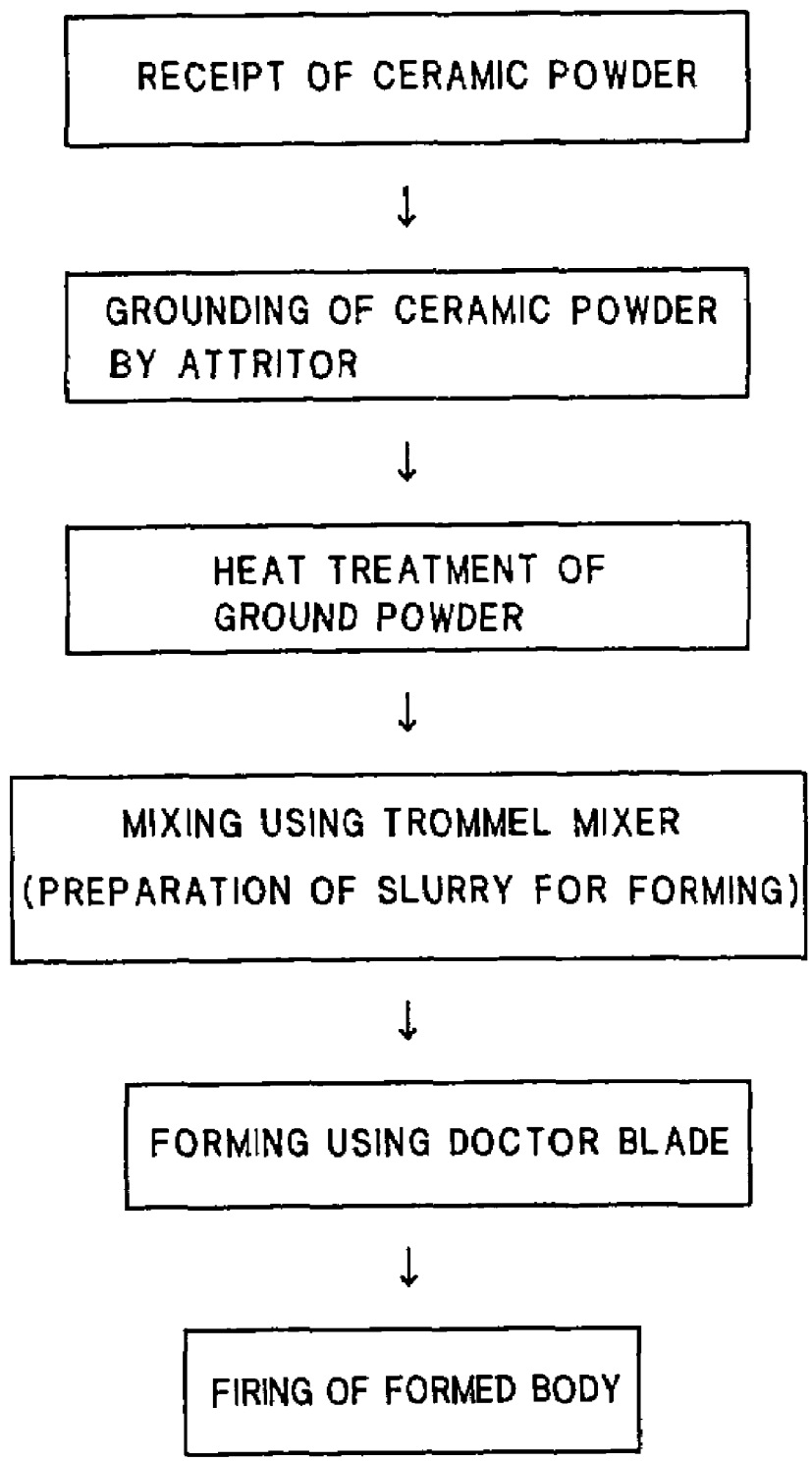
FIG. 5 is a drawing showing an embodiment of a green sheet manufacturing process.

In this instance, any of the manufacturing conditions can be modified inasmuch as such modification changes the average shrinkage. For example, in the case of the process for manufacturing green sheets shown in FIG. 5, the average shrinkage can be changed by adjusting the heat treatment conditions of the ground ceramic powder, specifically, the heat treatment temperature and the heat treatment time. Note that the term "heat treatment temperature" in the present specification means a maximum temperature among the temperatures used for treatment, and the term "heat treatment time" means a duration period of keeping the ground ceramic powder at the maximum temperature. The heat treatment time is from one hour to fifty hours, preferably from five hours to ten hours. FIG. 2 shows an example of a graph obtained by plotting the average shrinkage against the heat treatment temperature. When the estimated average shrinkage is smaller than the target average shrinkage, the difference between the estimated average shrinkage and the target average shrinkage can be eliminated by increasing the heat treatment temperature to a predetermined level, whereby the resulting shrinkage is approximated to the target average shrinkage. When the estimated average shrinkage is higher than the target average shrinkage, the actual average shrinkage can be approximated to the target average shrinkage by decreasing the heat treatment temperature to a predetermined level.

The above-mentioned green sheet can be produced by a wet forming method, in which a slurry for molding is obtained by adding additives such as a binder, a dispersant, and a plasticizer and a liquid such as butanol, and mixing them using a trommel mixer or the like. The following are suitable examples for the binder, the organic solvent, the dispersant, and the plasticizer useable in the present invention. Any binder may be usable as far as it is soluble in an organic solvent, however, polyvinyl butyrals, polyester methacrylic esters, ethyl cellulose, and the like are preferred. Examples of organic solvents include an alcohol such as methyl alcohol, ethyl alcohol, isopropyl alcohol, n-butyl alcohol, and the like; an aromatic hydrocarbon such as benzene, toluene, xylene and the like; a ketone such as methyl ethyl ketone, methyl isobutyl ketone, acetone, and the like; other common organic solvent such as trichloroethylene, tetrachloroethylene, and the like; and any mixture of the solvents mentioned above. Examples of a plasticizer include commonly used plasticizers such as phthalate esters, sebacic esters, ethylene glycol, and the like. Examples of a dispersant include common dispersants such as sorbitan fatty acid esters, surfactants, and the like.

Figure 3:
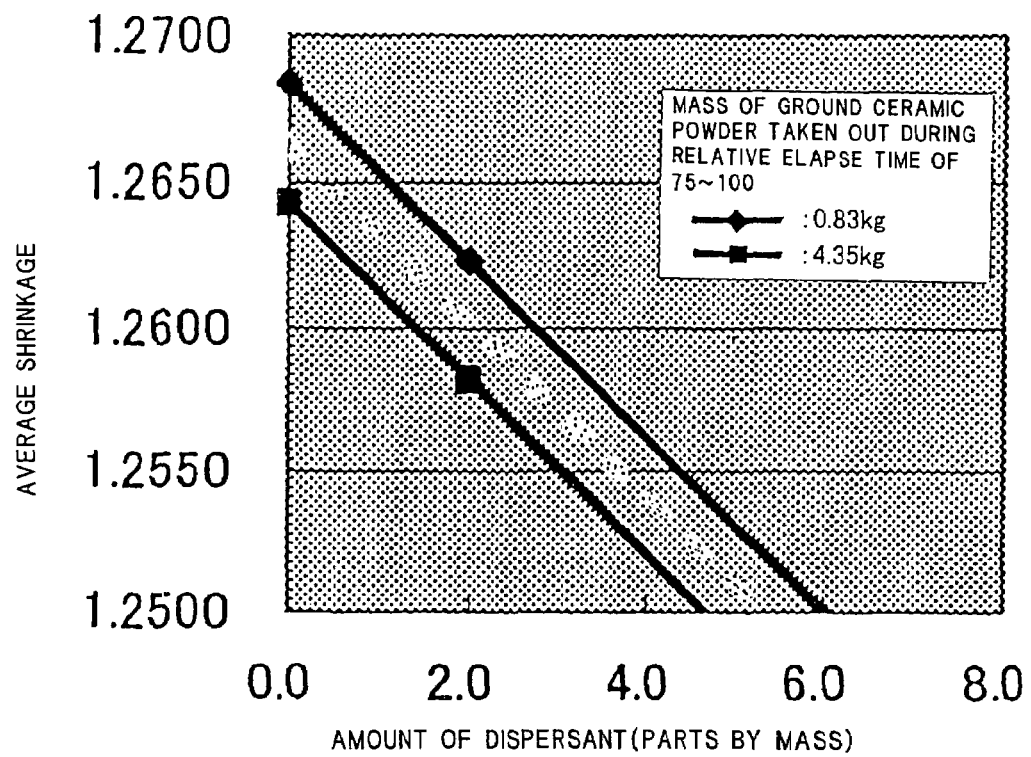
FIG. 3 illustrates an example of a graph obtained by plotting the average shrinkage against the amount of dispersant.

The average shrinkage can also be changed by adjusting the slurry composition. FIG. 3 shows an example of a graph obtained by plotting the average shrinkage against the amount of a dispersant. When the estimated average shrinkage is smaller than the target average shrinkage, the difference between the estimated average shrinkage and the target average shrinkage can be eliminated by decreasing the amount of the dispersant in the slurry to a predetermined level, whereby the resulting shrinkage is approximated to the target average shrinkage. When the estimated average shrinkage is higher than the target average shrinkage, the actual average shrinkage can be approximated to the target average shrinkage by increasing the amount of the dispersant in the slurry to a predetermined level.

Figure 4:
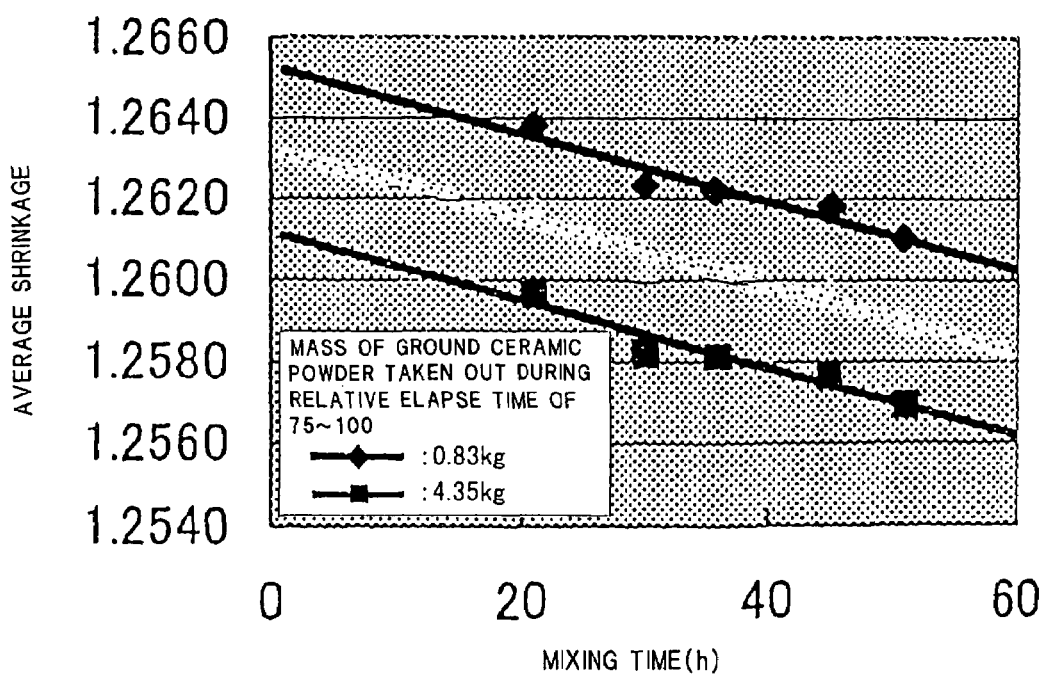
FIG. 4 illustrates an example of a graph obtained by plotting the average shrinkage against the mixing time of a trommel mixer.

Adjusting the mixing conditions when preparing the slurry for molding is another preferred method for changing the average shrinkage. FIG. 4 shows an example of a graph obtained by plotting the average shrinkage against the mixing time using a trommel mixer. When the estimated average shrinkage is smaller than the target average shrinkage, the difference between the estimated average shrinkage and the target average shrinkage can be eliminated by decreasing the mixing time to a predetermined level, whereby the resulting shrinkage is approximated to the target average shrinkage. When the estimated average shrinkage is higher than the target average shrinkage, the actual average shrinkage can be approximated to the target average shrinkage by increasing the mixing time for a predetermined period of time.

Although there are no specific limitations to the formed ceramic body obtained by forming the ground ceramic powder produced by a dry-type ball mill, followed by firing, the green sheet produced by the wet forming method can be given as a preferable example. Such a green sheet can be used for forming a multilayer ceramic substrate used for manufacturing electronic components such as ICs and condensers. The strict dimensional accuracy and shape accuracy required for such electronic components can be satisfied by precisely controlling the shrinkage according to the present invention.

Alumina, zirconia, silicon nitride, and the like can be used without any specific limitations as the ceramic in the present invention. The particles of ceramic powder obtained by grinding using the dry-type ball mill are preferably as small as 1 µm or less in terms of the equivalent spherical diameter (Rs). The Rs is still more preferably 0.05 to 0.6 µm. If the value of Rs is less than 0.05 µm, the particles unduly flocculate, making it difficult to smoothly grind the ceramic powder. If the value of Rs is more than 0.6 µm, it takes a long time to grind the particles, causing contamination of the ceramic powder with impurities from the mill balls.

The equivalent spherical diameter Rs is expressed by the following formula.

Rs (µm)=6/$\rho$S, wherein $\rho$ is the true density (g/cm$^3$) of the ceramic powder and S is the BET specific surface area (m$^2$/g) of the ceramic powder.

Here, the true density ($\rho$) of the ceramic powder is a theoretical density and is 6.10 g/cm$^3$ in the case of partially stabilized zirconia powder containing 3 mol % of yttria and 3.98 g/cm³ in the case of alumina powder.

EXAMPLES

The present invention is described below in detail by examples.

Example 1

A 50 l dry-type ball mill (Attritor Type-D, manufactured by Mitsui Mining. Co., Ltd.) was charged with 13 kg of partially stabilized zirconia powder (3YSE manufactured by Tosoh Corp., $Y_2O_3$: 5.15% by mass, $Al_2O_3$: 0.25% by mass, BET specific surface area: 7.0 m²/g). The mixture was ground for 15 minutes at a rotation of 220 rpm using 120 kg of zirconia balls. As a grinding adjuvant, 15 g of oleic acid ester of polyethylene glycol (Polynon 0-44, manufactured by Tetsuno Yuka Co., Ltd.) was added. After grinding, the bottom lid of the dry-type attritor ball mill was opened while rotating the stirring wings to take out the ground powder. The temporal response of the mass of taken out ground powder is shown in Table 1. It took eight minutes to remove 90% by mass of the ground powder of the partially stabilized zirconia powder put into the dry-type ball mill. The time required for removing the ground powder indicated in the parentheses in Table 1 is a relative time interval when the time for removing 90% by mass of the ground powder of the partially stabilized zirconia powder put into the ball mill after eight minutes was assumed to be 100. Six to eight minutes, for example, correspond to a relative time interval of 75 to 100.

TABLE 1

| Time | 0-2 minutes (0-25) | 2-4 minutes (25-50) | 4-6 minutes (50-75) | 6-8 minutes (75-100) | 8-10 minutes |
|---|---|---|---|---|---|
| Amount | 4.51 kg | 3.79 kg | 2.30 kg | 1.60 kg | 0.20 kg |

Prior to the above-mentioned grinding processing, a grinding process was carried out separately two times using partially stabilized zirconia powder of the same lot and the same dry-type ball mill (grinding process A and grinding process B). The mass of the ground powder taken out in a relative time interval of 75 to 100 was measured. The results are shown in Table 2. Green sheets were produced from the ground powders obtained in the grinding process A and grinding process B according to the manufacturing process shown in FIG. 5. The resulting average shrinkages are shown in Table 2. The manufacturing process details are as follows.

The partially stabilized zirconia powder was ground using a dry-type ball mill and filled into a capsule made of mullite. The capsule was placed in a kiln to heat the ground powder at 650° C. for ten hours. 100 parts by mass of the heat-treated powder, 7.6 parts by mass of polyvinyl butyral resin, 3.8 parts by mass of di-2-ethylhexyl phthalate, 2.0 parts by mass of a sorbitan dispersant, 34.0 parts by mass of xylene, and 34.0 parts by mass of 1-butanol were mixed together with zirconia balls in a trommel mixer for 30 hours. A green sheet with a dry thickness of 150 μm was prepared from the resulting slurry on a polyethylene terephthalate substrate film using a doctor-blade molding machine. Test specimens with a 70 mm×70 mm dimension punched from the resulting green sheet were placed in a kiln and fired in air at 1450° C. for two hours. The dimensions (length, width, and thickness) of the resulting fired body were measured to calculate the average shrinkage using the above-mentioned formula (1).

TABLE 2

| | Amount taken out in a 75-100 unit period | Average shrinkage |
|---|---|---|
| Grinding process A | 2.15 kg | 1.2576 |
| Grinding process B | 0.49 kg | 1.2623 |

Based on the results shown in Table 2, the correlation between the average shrinkage and the mass of ground powder taken out in a relative time interval of 75 to 100 can be expressed by a linear function of the following formula (5).

$$\text{Average shrinkage} = -2.83 \times 10^{-3} \times (\text{amount taken out in a 75-100 unit time(kg)}) + 1.2637 \quad (5).$$

Since the mass of the ground powder taken out in a relative time interval of 75 to 100 in the first grinding process in this Example is 1.60 kg, as shown in Table 1, assuming that a green sheet is produced from the ground powder obtained in this grinding process by the same manufacturing process as above, the average shrinkage of the green sheet is estimated to be 1.2592 from the following formula (6):

$$\text{Average shrinkage} = -2.83 \times 10^{-3} \times (1.60) + 1.2637 = 1.2592 \quad (6).$$

Here, when the target average shrinkage is 1.261, the difference between the target average shrinkage and the above average shrinkage is offset (corrected) by changing the temperature at which the ground powder is treated with heat. The relationship between the average shrinkage and the heat treatment temperature is shown by the following formula (7):

$$\text{Average shrinkage} = +7.26 \times 10^{-5} \times (\text{heat treatment temperature}(° C.)) + b \quad (7),$$

wherein b is a constant that represents the intercept of the linear correlation.

Because the estimated average shrinkage of the green sheet obtained by the above manufacturing process, in which the heat treatment temperature of 650° C. is employed, is 1.2592, to increase this average shrinkage to 1.2610, the heat treatment temperature should be increased to 675° C. as can be calculated from the following formulas (8) and (9). In an experiment of producing a green sheet by changing the heat treatment temperature from 650° C. to 675° C. in the above manufacturing process, an average shrinkage of 1.2611 was achieved, confirming that the rate was almost the same as the target average shrinkage.

$$1.2592 = +7.26 \times 10^{-5} \times (650) + b \quad (8);$$

and $$1.2610 = +7.26 \times 10^{-5} \times (\text{heat treatment temperature}(° C.)) + b \quad (9).$$

Choices as to which manufacturing conditions (i.e., the heat treatment temperature of the ground powder, the amount of dispersant, or the mixing time in the trammel mixer) should be adjusted is determined based on the difference in the average shrinkage calculated based on the amount of the ground powder taken out from the ball mill, on which the correlation is based, and the target shrinkage.

For example, when partially stabilized zirconia powder is used, the slope values of the linear relationship between the heat treatment temperature, the amount of dispersant and the mixing time in the trammel mixer with respect to the value of shrinkage are $7.26 \times 10^{-5}$, $-3.1 \times 10^{-3}$ and $-8.33 \times 10^{-5}$, respectively (see FIGS. 2-4). When the difference between the estimated expected shrinkage and the target shrinkage is big, the amount of dispersant having large value is selected in order to adjust the difference (as discussed below).

In contrast, when the difference between the estimated expected shrinkage and the target shrinkage is small, the difference is adjusted based on either the heat treatment temperature or mixing time in the trammel mixer. If changing the mixing time in the trammel mixer would require a longer adjusting time, then the heat treatment temperature is selected to adjust the difference, as discussed above.

Example 2

A 50 l dry-type ball mill (Type-D, manufactured by Mitsui Mining. Co., Ltd.) was charged with 13 kg of partially stabilized zirconia powder (3YSE manufactured by Tosoh Corp., $Y_2O_3$: 5.15% by mass, $Al_2O_3$: 0.25% by mass, BET specific surface area: 7.1 $m^2/g$). The mixture was ground for 15 minutes at a rotation of 220 rpm using 120 kg of zirconia balls. As a grinding adjuvant, 15 g of oleic acid ester of polyethylene glycol (Polynon 0-44, manufactured by Tetsuno Yuka Co., Ltd.) was added. After grinding, the bottom lid of the dry-type ball mill was opened while rotating the stirring wings to take out the ground powder. The temporal response of the mass of the taken out ground powder is shown in Table 3. The time required for taking out of the ground powder indicated in the parentheses in Table 3 is a relative time interval when the time for talking out 90% by mass of the ground powder of the partially stabilized zirconia powder put into the ball mill was assumed to be 100.

TABLE 3

| | Time | | | |
|---|---|---|---|---|
| | (0-25) | (25-50) | (50-75) | (75-100) |
| Amount | 4.41 kg | 3.70 kg | 2.19 kg | 1.70 kg |

Since the mass of ground powder taken out in a relative time interval of 75 to 100 in this grinding process is 1.70 kg, as shown in Table 3, assuming that a green sheet is produced from the ground powder obtained in this grinding process by the same manufacturing process as above, based on the correlation of formula (5) in Example 1, the average shrinkage of the green sheet is estimated to be 1.2589 from the following formula (10).

$$\text{Average shrinkage}=-2.83\times10^{-3}\times(1.70)+1.2637=1.2589 \quad (10)$$

Here, when the target average shrinkage is 1.261, the difference between the target average shrinkage and the above estimated average shrinkage is offset (corrected) by changing the amount of a dispersant. The relationship between the average shrinkage and the amount of dispersant is shown by the following formula (11).

$$\text{Average shrinkage}=-3.1\times10^{-3}\times(\text{amount of dispersant}(\% \text{ by mass}))+C \quad (11)$$

wherein C is a constant that represents the intercept of the linear correlation.

Because the estimated average shrinkage of the green sheet obtained by the above manufacturing process, in which the amount of the dispersant used is 2.0% by mass, is 1.2589, to increase this average shrinkage to 1.2610, the amount of the dispersant should be decreased to 1.3% by mass as can be calculated from the following formulas (12) and (13). In an experiment of producing a green sheet by changing the amount of dispersant from 2.0% by mass to 1.3% by mass in the above manufacturing process, the average shrinkage of 1.2609 was achieved, confirming that the rate was almost the same as the target average shrinkage.

$$1.2589=-3.1\times10^{-3}\times(2.0)+C \quad (12);$$

and $$1.2610=-3.1\times10^{-3}\times(\text{amount of dispersant}(\% \text{ by mass}))+C \quad (13).$$

Example 3

A 50 l dry-type ball mill (Type-D, manufactured by Mitsui Mining. Co., Ltd.) was charged with 13 kg of partially stabilized zirconia powder (3YSE manufactured by Tosoh Corp., $Y_2O_3$: 5.15% by mass, $Al_2O_3$: 0.25% by mass, BET specific surface area: 6.8 $m^2/g$). The mixture was ground for 15 minutes at a rotation of 220 rpm using 120 kg of zirconia balls. As a grinding adjuvant, 15 g of oleic acid ester of polyethylene glycol (Polynon 0-44, manufactured by Tetsuno Yuka Co., Ltd.) was added. After grinding, the bottom lid of the dry-type ball mill was opened while rotating the stirring wings to take out the ground powder. The temporal response of the mass of taken out ground powder is shown in Table 4. The time required for taking out of the ground powder indicated in the parentheses in Table 4 is a relative time interval when the time for removing 90% by mass of the ground powder of the partially stabilized zirconia powder put into the ball mill was assumed to be 100.

TABLE 4

| | Time | | | |
|---|---|---|---|---|
| | (0-25) | (25-50) | (50-75) | (75-100) |
| Amount | 4.80 kg | 4.10 kg | 2.60 kg | 0.75 kg |

Since the mass of ground powder taken out in a relative time interval of 75 to 100 in this grinding process is 0.75 kg, as shown in Table 4, assuming that a green sheet is produced from this ground powder by the same manufacturing process as above, the average shrinkage of the green sheet is estimated to be 1.2616 from the following formula (14), if the correlation of formula (5) in Example 1 is applied.

$$\text{Average shrinkage}=-2.83\times10^{-3}\times(0.75)+1.2637=1.2616 \quad (14)$$

Here, when the target average shrinkage is 1.261, the difference between the target average shrinkage and the above estimated average shrinkage is offset (corrected) by changing the mixing time of a trommel mixer. The relationship between the average shrinkage and the mixing time using a trommel mixer is shown by the following formula (15).

$$\text{Average shrinkage}=-8.33\times10^{-5}\times(\text{mixing time (hour)})+d \quad (15)$$

wherein d is a constant that represents the intercept of the linear correlation.

Because the estimated average shrinkage of the green sheet obtained by the above manufacturing process is 1.2617 when the mixing time of the trommel mixer is 30 hours, to decrease this average shrinkage to 1.2610, the mixing time of the trommel mixer should be increased to 37.2 hours according to the following formulas (16) and (17). In an experiment of producing a green sheet by increasing the mixing time of the trommel mixer from 30 hours to 37.2 hours in the above manufacturing process, an average shrinkage of 1.2610 was achieved, confirming that the rate was the same as the target average shrinkage.

$$1.2616 = -8.33 \times 10^{-5} \times (30) + d \quad (16);$$

and $$1.2610 = -8.33 \times 10^{-5} \times (\text{mixing time(hour)}) + d \quad (17).$$

Example 4

A 5 l dry-type ball mill (Type-D, manufactured by Mitsui Mining. Co., Ltd.) was charged with 1.3 kg of partially stabilized zirconia powder (3YSE manufactured by Tosoh Corp., $Y_2O_3$: 5.15% by mass, $Al_2O_3$: 0.25% by mass, BET specific surface area: 7.2 $m^2/g$). The mixture was ground for 15 minutes at a rotation of 220 rpm using 12 kg of zirconia balls. As a grinding adjuvant, 1.5 g of oleic acid ester of polyethylene glycol (Polynon 0-44, manufactured by Tetsuno Yuka Co., Ltd.) was added. After grinding, the bottom lid of the dry-type ball mill was opened while rotating the stirring wings to take out the ground powder. The temporal response of the mass of taken out ground powder is shown in Table 5. The time required for taking out of the ground powder indicated in the parentheses in Table 5 is a relative time interval when the time for removing 90% by mass of the ground powder of the partially stabilized zirconia powder put into the ball mill was assumed to be 100.

TABLE 5

| | Time | | | |
|---|---|---|---|---|
| | (0-25) | (25-50) | (50-75) | (75-100) |
| Amount | 0.46 kg | 0.39 kg | 0.24 kg | 0.17 kg |

Prior to the above-mentioned grinding processing, a grinding process was carried out separately two times using the same partially stabilized zirconia powder and the same dry-type ball mill (grinding process C and grinding process D). The mass of ground powder taken out in a relative time interval of 75 to 100 was measured. The results are shown in Table 6. Green sheets were produced from the ground powders obtained in the grinding process C and grinding process D according to the manufacturing process shown in FIG. 5. The resulting average shrinkages are shown in Table 6. The manufacturing process details are as follows.

The partially stabilized zirconia powder was ground using a dry-type ball mill and filled into a capsule made of mullite. The capsule was placed in a kiln to heat the ground powder at 650° C. for ten hours. 100 parts by mass of the heat-treated powder, 7.6 parts by mass of polyvinyl butyral resin, 3.8 parts by mass of di-2-ethylhexyl phthalate, 2.0 parts by mass of a sorbitan dispersant, 34.0 parts by mass of xylene, and 34.0 parts by mass of 1-butanol were mixed together with zirconia balls in a trommel mixer for 30 hours. A green sheet with a dry thickness of 150 μm was prepared from the resulting slurry on a polyethylene terephthalate substrate film using a doctor-blade molding machine. Test specimens with a 70 mm×70 mm dimension punched from the resulting green sheet were placed in a kiln and fired in air at 1450° C. for two hours. The dimensions (length, width, and thickness) of the resulting fired body were measured to calculate the average shrinkage using the above-mentioned formula (1).

TABLE 6

| | Amount taken out in a 75-100 unit period | Average shrinkage |
|---|---|---|
| Grinding process C | 0.23 kg | 1.2570 |
| Grinding process D | 0.05 kg | 1.2618 |

Based on the results shown in Table 6, the correlation between the average shrinkage and the mass of ground powder taken out in a relative time interval of 75 to 100 can be expressed by a linear function of the following formula (18).

$$\text{Average shrinkage} = -2.67 \times 10^{-2} \times (\text{amount taken out in a 75-100 unit time(kg)}) + 1.2631 \quad (18)$$

Since the mass of the ground powder taken out in a relative time interval of 75 to 100 in the first grinding process in this Example is 0.17 kg, as shown in Table 5, assuming that a green sheet is produced from this ground powder by the same manufacturing process as above, the average shrinkage of the green sheet is estimated to be 1.2586 from the following formula (19).

$$\text{Average shrinkage} = -2.67 \times 10^{-2} \times (0.17) + 1.2631 = 1.2586 \quad (19).$$

Here, when the target average shrinkage is 1.261, the difference between the target average shrinkage and the above average shrinkage is offset (corrected) by changing the temperature when the ground powder is treated with heat. The relationship between the average shrinkage and the heat treatment temperature is shown by the above formula (7).

Because the estimated average shrinkage of the green sheet obtained by the above manufacturing process, in which the heat treatment temperature of 650° C. is employed, is 1.2586, to increase this average shrinkage to 1.2610, the heat treatment temperature should be increased to 683° C. as can be calculated from the following formulas (20) and (21). In an experiment of producing a green sheet by changing the heat treatment temperature from 650° C. to 683° C. in the above manufacturing process, the average shrinkage of 1.2608 was achieved, confirming that the rate was almost the same as the target average shrinkage.

$$1.2586 = +7.26 \times 10^{-5} \times (650) + b \quad (20);$$

and $$1.2610 = +7.26 \times 10^{-5} \times (\text{Heat treatment temperature}) + b \quad (21).$$

Example 5

A 50 l dry-type ball mill (Type-D, manufactured by Mitsui Mining. Co., Ltd.) was charged with 8.45 kg of alumina powder (AL-150GS-3 manufactured by Showa Denko, Co., Ltd., $Al_2O_3$: 99.5% by mass, BET specific surface area: 6.4 $m^2/g$). The mixture was ground for 15 minutes at a rotation of 220 rpm using 120 kg of zirconia balls. As a grinding adjuvant, 10 g of oleic acid ester of polyethylene glycol (Polynon 0-44, manufactured by Tetsuno Yuka Co., Ltd.) was added. After grinding, the bottom lid of the dry-type ball mill was opened while rotating the stirring wings to take out the ground powder. The temporal response of the mass of the taken out ground powder is shown in Table 7. The time required for taking out the ground powder indicated in the parentheses in Table 7 is a relative time interval when the time for removing 90% by mass of the ground powder of the alumina powder put into the ball mill was assumed to be 100.

TABLE 7

| | Time | | | |
|---|---|---|---|---|
| | (0-25) | (25-50) | (50-75) | (75-100) |
| Amount | 2.93 kg | 2.46 kg | 1.50 kg | 1.04 kg |

Prior to the above-mentioned grinding processing, a grinding process was carried out separately two times using the same alumina powder and the same dry-type ball mill (grinding process E and grinding process F). The mass of ground powder taken out in a relative time interval of 75 to 100 was measured. The results are shown in Table 8. Green sheets were produced from the ground powders obtained in the grinding process E and grinding process F according to the manufacturing process shown in FIG. 5. The resulting average shrinkages are shown in Table 8. The manufacturing process details are as follows.

The alumina powder was ground using a dry-type ball mill and filled in a capsule made of mullite. The capsule was placed in a kiln to heat the ground powder at 700° C. for one hour. 100 parts by mass of the heat-treated powder, 11.0 parts by mass of polyvinyl butyral resin, 5.5 parts by mass of dioctyl phthalate, 2.0 parts by mass of a sorbitan dispersant, 55.0 parts by mass of xylene, and 55.0 parts by mass of 1-butanol were mixed together with zirconia balls in a trommel mixer for 30 hours. A green sheet with a dry thickness of 150 μm was prepared from the resulting slurry on a polyethylene terephthalate substrate film using a doctor-blade molding machine. Test specimens with a 70 mm×70 mm dimension punched from the resulting green sheet were placed in a kiln and fired in air at 1400° C. for two hours. The dimensions (the length, width, and thickness) of the resulting fired body were measured to calculate the average shrinkage using the above-mentioned formula (1).

TABLE 8

| | Amount taken out in a 75-100 unit period | Average shrinkage |
|---|---|---|
| Grinding process E | 1.40 kg | 1.2341 |
| Grinding process F | 0.32 kg | 1.2356 |

Based on the results shown in Table 8, the correlation between the average shrinkage and the mass of ground powder taken out in a relative time interval of 75 to 100 can be expressed by a linear function of the following formula (22).

$$\text{Average shrinkage} = -1.39 \times 10^{-3} \times (\text{amount taken out in a 75-100 unit time(kg)}) + 1.2360 \quad (22)$$

Since the mass of ground powder taken out in a relative time interval of 75 to 100 in the first grinding process in this Example is 1.04 kg, as shown in Table 7, assuming that a green sheet is produced from the ground powder obtained in this grinding process by the same manufacturing process as above, the average shrinkage of the green sheet is estimated to be 1.2346 from the following formula (23).

$$\text{Average shrinkage} = -1.39 \times 10^{-3} \times (1.04) + 1.2360 = 1.2346 \quad (23)$$

Here, when the target average shrinkage is 1.2300, the difference between the target average shrinkage and the above estimated average shrinkage is offset (corrected) by changing the temperature when the ground powder is treated with heat. The relationship between the average shrinkage and the heat treatment temperature is shown by the following formula (24).

$$\text{Average shrinkage} = -3.65 \times 10^{-5} \times (\text{heat treatment temperature}(^\circ C.)) + e \quad (24)$$

wherein e is a constant that represents the intercept of the linear correlation.

Because the estimated average shrinkage of the green sheet obtained by the above manufacturing process, in which the heat treatment temperature of 700° C. is employed, is 1.2346, to decrease this average shrinkage to 1.2300, the heat treatment temperature should be increased to 826° C. as can be calculated from the following formulas (25) and (26). In an experiment of producing a green sheet by changing the heat treatment temperature from 700° C. to 826° C. in the above manufacturing process, the average shrinkage of 1.2301 was achieved, confirming that the rate was almost the same as the target average shrinkage.

$$1.2346 = -3.65 \times 10^{-5} \times (700) + e \quad (25)$$

and $$1.2300 = -3.65 \times 10^{-5} \times (\text{Heat treatment temperature}) + e \quad (26)$$

The intercept of "b" to "e" are cancelled at the time the conditions to obtain the target value of shrinkage are calculated. However, these intercepts can be obtained easily from the formulas discussed above, and they are as follows:
"b"=1.2120; "c"=1.2651; "d"=1.2641; and "e"=1.2602.

The present invention can be suitably used for controlling the shrinkage which is an indication of firing shrinkage when a fired body is obtained by firing a formed ceramic body in the manufacture of ceramic products. The method can be suitably used for forming a multilayer ceramic substrate which is used for manufacturing electronic components such as ICs and condensers, which require strict dimensional accuracy and shape accuracy.

What is claimed is:

1. A method for controlling the shrinkage of ceramic formed bodies comprising the steps of:
    obtaining a ceramic powder;
    performing a preliminary test on at least two test lots of the obtained ceramic powder comprising
        charging a first test lot of the obtained ceramic powder into a dry-type attritor ball mill,
        grinding the first test lot of the ceramic powder in the attritor ball mill for a predetermined time,
        measuring amounts of the first test lot of the ground ceramic powder that are discharged from the attritor ball mill over a number of time intervals to determine which of the time intervals represents a point where 90% of a total mass of the first test lot of the ground ceramic powder has been removed from the attritor ball mill, and identifying that time interval as 75-100,
        forming a ceramic formed body from the first test lot of the ground ceramic powder under a given set of processing conditions,
        repeating the charging, grinding, measuring and forming steps for at least a second test lot of the obtained ceramic powder; and
        measuring an average shrinkage of the ceramic formed bodies made from the respective test lots of the obtained ceramic powder;
    determining a linear correlation between the average shrinkage of the ceramic formed bodies formed from the test lots, plotted on a vertical axis, and the measured amounts of the test lots of the ground ceramic powder that were removed during respective 75-100 time intervals, plotted on a horizontal axis;

charging a batch of the obtained ceramic powder into the attritor ball mill and grinding the batch of obtained ceramic powder for a predetermined time, measuring an amount of the batch of the ground ceramic powder that is removed from the attritor ball mill during the 75-100 time interval, using the linear correlation to estimate an expected shrinkage for a ceramic formed body made from the batch of the ground ceramic powder under the same processing conditions as that used in connection with the test lots, and determining a difference between a target shrinkage and the estimated expected shrinkage; and changing one or more of the processing conditions in the given set of processing conditions in order to offset the difference between the target shrinkage and the estimated expected shrinkage of the ceramic formed body made from the batch of the obtained ceramic powder.

2. The method according to claim 1, wherein the average shrinkage of each ceramic formed body of each test lot is determined using the following formula (1):

Average shrinkage of the ceramic formed body=(longitudinal shrinkage of the ceramic formed body+lateral shrinkage of the ceramic formed body+thickness shrinkage of the ceramic formed body)/3 (1);

wherein the longitudinal shrinkage of the ceramic formed body is a value determined by the following formula (2), the lateral shrinkage of the ceramic formed body is a value determined by the following formula (3), and the thickness shrinkage of the ceramic formed body is a value determined by the following formula (4);

Longitudinal shrinkage of the ceramic formed body=longitudinal dimension of the ceramic formed body before firing/longitudinal dimension after firing (2);

Lateral shrinkage of the ceramic formed body=lateral dimension of the ceramic formed body before firing/lateral dimension of the ceramic formed body after firing (3);

and

Thickness shrinkage of the ceramic formed body=thickness of the ceramic formed body before firing/thickness of the ceramic formed body after firing (4).

3. The method according to claim 1, wherein the given set of processing conditions include at least a heat treatment temperature of the ground ceramic powder, a composition of a forming slurry containing the ground ceramic powder and mixing conditions of the forming slurry.

4. The method according to claim 3, wherein the heat treatment conditions of the ground ceramic powder are changed to offset the difference between the estimated expected shrinkage and the target shrinkage.

5. The method according to claim 3, wherein the composition of the forming slurry is changed to offset the difference between the estimated expected shrinkage and the target shrinkage.

6. The method according to claim 5, wherein the ceramic powder charged into the dry-type attritor ball mill has an equivalent spherical diameter (Rs), represented by the formula Rs ($\mu$m)=6/$\rho$S, of 1 $\mu$m or less, wherein $\rho$ is a true density (g/cm$^3$) of the ceramic powder and S is a BET specific surface area (m$^2$/g) of the ceramic powder.

7. The method according to claim 5, wherein an amount of dispersant in the composition of the forming slurry is changed to offset the difference between the estimated expected shrinkage and the target shrinkage.

8. The method according to claim 3, wherein the mixing conditions of the forming slurry are changed to offset the difference between the estimated expected shrinkage and the target shrinkage.

9. The method according to claim 8, wherein a mixing time of the forming slurry is changed to offset the difference between the estimated expected shrinkage and the target shrinkage.

* * * * *